(12) United States Patent
Wang et al.

(10) Patent No.: US 9,708,223 B2
(45) Date of Patent: *Jul. 18, 2017

(54) DIELECTRIC CERAMIC MATERIAL

(71) Applicant: HOLY STONE ENTERPRISE CO., LTD., Taipei (TW)

(72) Inventors: Sea-Fue Wang, Taipei (TW); Jian-Hua Li, Taipei (TW); Yuan-Cheng Lai, Taoyuan (TW); Yu-Wen Hung, Taipei (TW); Jun-Hao Deng, Taoyuan (TW); Ming-Hua Chen, Taipei (TW)

(73) Assignee: HOLY STONE ENTERPRISE CO., LTD., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/152,045

(22) Filed: May 11, 2016

(65) Prior Publication Data

US 2016/0251266 A1 Sep. 1, 2016

Related U.S. Application Data

(63) Continuation of application No. 14/577,905, filed on Dec. 19, 2014, now Pat. No. 9,365,458, which is a
(Continued)

(30) Foreign Application Priority Data

Mar. 22, 2012 (TW) .............................. 101109970 A
Jun. 9, 2014 (TW) .............................. 103119920 A (51) Int. Cl.
*C04B 35/468* (2006.01)
*C04B 35/495* (2006.01)
(Continued)

(52) U.S. Cl.
CPC ........ *C04B 35/4682* (2013.01); *C04B 35/468* (2013.01); *C04B 35/495* (2013.01);
(Continued)

(58) Field of Classification Search
CPC .. C04B 35/468; C04B 35/4682; C04B 35/495
See application file for complete search history.

(56) References Cited

U.S. PATENT DOCUMENTS 6,426,018 B1 7/2002 Takahashi et al.
6,783,588 B2 8/2004 Aoto et al.
(Continued)

FOREIGN PATENT DOCUMENTS

JP 2003081675 3/2003
TW I397090 5/2013
TW 201340146 10/2013

*Primary Examiner* — Karl Group
(74) *Attorney, Agent, or Firm* — Muncy, Geissler, Olds & Lowe, P.C.

(57) ABSTRACT

A dielectric ceramic material includes the composite ceramic powder of $BaTiO_3$ and $Ba_2LiTa_5O_{15}$, or $BaTiO_3$ and $Ba_2LiNb_5O_{15}$ that are based on the oxides of BaO, $TiO_2$, $Li_2O$ and $Ta_2O_5$, or BaO, $TiO_2$, $Li_2O$ and $Nb_2O5$ as initial powder materials prepared subject to a respective predetermined percentage. This dielectric ceramic material simply uses simple binary oxides as initial powder materials that are easy to obtain and inexpensive, and that eliminate the complicated manufacturing process of synthesizing $BaTiO_3$, $Ba_2LiTa_5O_{15}$ or $Ba_2LiNb_5O_{15}$, making the whole process more simple and the manufacturing cost more cheaper and preventing the formation of other compounds.

6 Claims, 8 Drawing Sheets

Related U.S. Application Data continuation-in-part of application No. 13/569,616, filed on Aug. 8, 2012, now Pat. No. 9,023,748.

(51) Int. Cl.
*H01G 4/30* (2006.01)
*H01G 4/12* (2006.01)
*H01B 3/12* (2006.01)

(52) U.S. Cl.
CPC .............. *H01B 3/12* (2013.01); *H01G 4/1227* (2013.01); *H01G 4/30* (2013.01); *C04B 2235/3201* (2013.01); *C04B 2235/3203* (2013.01); *C04B 2235/3215* (2013.01); *C04B 2235/3229* (2013.01); *C04B 2235/3231* (2013.01); *C04B 2235/3232* (2013.01); *C04B 2235/3236* (2013.01); *C04B 2235/3251* (2013.01); *C04B 2235/3255* (2013.01); *C04B 2235/96* (2013.01)

(56) References Cited

U.S. PATENT DOCUMENTS

| | | |
|---|---|---|
| 6,793,843 B2 | 9/2004 | Furukawa et al. |
| 7,541,306 B2 | 6/2009 | Koebrugge et al. |
| 7,751,178 B2 | 7/2010 | Suzuki |
| 7,821,770 B2 | 10/2010 | Nishikawa et al. |
| 8,194,392 B2 | 6/2012 | Malhan et al. |
| 2009/0036293 A1 | 2/2009 | Shimada et al. |
| 2009/0105064 A1 | 4/2009 | Shimada et al. |

DIELECTRIC CERAMIC MATERIAL

This application is a Continuation of co-pending application Ser. No. 14/577,905, filed on Dec. 19, 2014, which issued as U.S. Pat. No. 9,365,458 on Jun. 14, 2016, which is a Continuation-in-Part of application Ser. No. 13/569,616, filed on Aug. 8, 2012, which issued as U.S. Pat. No. 9,023,748 on May 5, 2015, for which priority is claimed under 35 U.S.C. §120, and this application claims priority of Application No. 101109970 filed in Taiwan on Mar. 22, 2012 and Application No. 103119920 filed in Taiwan on Jun. 9, 2014, under 35 U.S.C. §119; the entire contents of all of which are hereby incorporated by reference.

BACKGROUND OF THE INVENTION

1. Field of the Invention

The present invention relates to ceramic material technology and more particularly, to a dielectric ceramic material, which uses binary oxides as initial powder materials and prepared in accordance with the corresponding proportion of the respective metal element.

2. Description of the Related Art

With the rapid development of technology, the direction of development of capacitor goes toward miniaturization, high capacity, high stability and high reliability. Nowadays, chip-based multilayer ceramic capacitor (MLCC) has been intensively used to substitute conventional capacitors, not only to reduce the size and increase the capacitor capacitance, but also reduce the production costs. So, multilayer ceramic capacitor is one of the currently mostly used electronic components in computers, mobile phones, automotive electronic devices.

According to different application ranges and electrical characteristics, US Electronic Industries Association (EIA) summarized capacitors as Class I temperature compensating type capacitors and Class II high dielectric constant capacitors whose capacitance is higher than that of Class I. The following Table I illustrates a capacitor specification constructed subject US Electronic Industries Association (EIA) Class II. For the advantage of high dielectric temperature stability, X8S (−55° C.~150° C., ΔC/C≤22%) multilayer ceramic capacitor has been widely used in miniature electronic components and vehicles under a high temperature variation environment. Automobile electronic devices, such as engine control unit (ECU), anti-lock braking system ABS and proprietary digital electronic fuel injection system (PG-MFI), need to operate in a fairly harsh environmental condition. Therefore, for safety reasons, when a multilayer ceramic capacitor to be applied to this fairly harsh environmental condition, it needs to have a more stable and higher temperature range (greater than 150° C.) of dielectric characteristic. Capacitor with ultra-high temperature stability will be essential elements for electronic systems for high temperature operation.

TABLE I

| US EIA Class II Capacitor Specification Table | | | | | |
|---|---|---|---|---|---|
| Low Temp. | Symbol | High Temp. | Symbol | Max. %Δ | C Symbol |
| −55° C. | X | +45° C. | 3 | ±1.0% | A |
| −30° C. | Y | +65° C. | 4 | ±1.2% | B |
| −10° C. | Z | +85° C. | 5 | ±2.2% | C |
|  |  | +105° C. | 6 | ±3.3% | D |
|  |  | +125° C. | 7 | ±4.7% | E |
|  |  | +150° C. | 8 | ±7.5% | F |

TABLE I-continued

| US EIA Class II Capacitor Specification Table | | | | | |
|---|---|---|---|---|---|
| Low Temp. | Symbol | High Temp. | Symbol | Max. %Δ | C Symbol |
|  |  | +200° C. | 9 | ±10.0% | P |
|  |  |  |  | ±15.0% | R |
|  |  |  |  | ±22.0% | S |
|  |  |  |  | +22%/−33% | T |
|  |  |  |  | +22%/−56% | U |
|  |  |  |  | +22%/−82% | V |

Ex.: X7R −55~+125° C. ± 15% Y5V −30~+85° C. + 22%/−82%

Further, Barium Titanate ($BaTiO_3$) has excellent dielectric characteristic, and is often used as a dielectric ceramic material for capacitor. However, in order to fit different application requirements, modifying agents may be selectively added to alter the electrical characteristics of barium titanate ($BaTiO_3$). U.S. Pat. No. 7,751,178 discloses a ceramic dielectric of which the static capacitance-temperature characteristics can satisfy EIA-X8R specifications. This dielectric ceramic includes a perovskite type compound represented by the composition formula $(Ba_{1-x-y}Ca_xSn_y)_m(Ti_{1-z}Zr_z)O_3$ (where x, y, z, and m satisfy $0.9990 \leq m \leq 1.015$, $0 \leq x \leq 0.20$, $0.02 \leq y \leq 0.20$, $0 \leq z \leq 0.05$ respectively) as a primary component; and RE as an accessory component (where RE is at least one selected from the group consisting of Y, La, Ce, Pr, Nd, Sm, Eu, Gd, Tb, Dy, Ho, Er, Tm, Yb, and Lu), wherein 0.5 to 20 molar parts of RE is contained with respect to 100 molar parts of the primary component.

Taiwan Patent 1397090 discloses a dielectric ceramic composition of which the static capacitance-temperature characteristics can satisfy EIA-X8R specifications. This dielectric ceramic composition includes a $BaTiO_3$ based primary component; and a glassy ingredient as an accessory component. The $BaTiO_3$ based primary component includes the metal oxides of AO, MnO, $B_2O_5$ and $Re_2O_3$. Element A is selected from the group of Mg, Ca, Sr and Ba. Element B is selected from the group of V, Nb and Ta. Element Re is selected from the group of Y, Tb, Dy, Ho, Er, Tm and Yb. The glassy ingredient is composed of the oxide of $SiO_2$—$TiO_2$—XO wherein X is selected from the group of BaCa, SrMg, Zn and Mn.

Further, Taiwan Patent 201340146, issued to the present inventor, discloses a composite dielectric ceramic material that satisfies EIA-X8R and X9R specifications. This composite dielectric ceramic material includes $(1-x)BaTiO_3-xLiTaO_3$, $(1-x)BaTiO_3-xNaNbO_3$ and $(1-x)BaTiO_3-xBaCeO_3$ (in these three material groups, x: 0.01~0.50). This invention also discloses a kind of high temperature stable dielectric ceramic material design principle that is based on the viewpoint of composite material to prepare a composite phase by mixing a dielectric material of high Curie temperature with a dielectric material of low Curie temperature. These two dielectric materials compensate for each other, wherein the dielectric material of low Curie temperature is based on the primary component of $BaTiO_3$ of Curie temperature about 130° C.; the dielectric material of high Curie temperature is preferably over 200° C.

However, the aforesaid various dielectric ceramic materials commonly use $BaTiO_3$ or Pervovskite compound as the primary component and at least one modifying agent, glassy ingredient or metal oxides (such as $LiTaO_3$, $Li_2CO_3$ and $Ta_2O_5$) as an accessory component to alter the electric characteristics of $BaTiO_3$, and to stabilize the rate of change of the temperature of the dielectric constant. However, these dielectric ceramic material systems need to use a ternary oxide (such as $BaTiO_3$, $LiTaO_3$ or $Li_2CO_3$) as the initial powder material and prepared in accordance with a predetermined ratio. The material is difficult to get and more expensive. Further, the manufacturing process of the dielectric ceramic material system is complicated or cumbersome, and other unnecessary compounds (such as $Li_3TaO_4$) can be produced during the manufacturing process, resulting in that the overall costs of the materials needed for the production cannot be effectively reduced. So, adding a predetermined ratio of compounds to barium titanate to prepare a dielectric ceramic material having ultra stable dielectric characteristics that comply with actual application is the major subject to be engaged in this industry.

SUMMARY OF THE INVENTION

The present invention has been accomplished under the circumstances in view. It is one object of the present invention to provide a dielectric ceramic material, which includes the composite dielectric ceramic powders of $BaTiO_3$ and $Ba_2LiTa_5O_{15}$, or, $BaTiO_3$ and $Ba_2LiNb_5O_{15}$, wherein $BaTiO_3$ and $Ba_2LiTa_5O_{15}$, or, $BaTiO_3$ and $Ba_2LiNb_5O_{15}$ use the oxides of $BaO$, $TiO_2$, $Li_2O$ and $Ta_2O_5$, or the oxides of $BaO$, $TiO_2$, $Li_2O$ and $Nb_2O_5$ as the initial powder materials prepared subject to a predetermined percentage. This dielectric ceramic material simply uses simple binary oxides as initial powder materials that are easy to obtain and inexpensive, and that eliminate the complicated manufacturing process of synthesizing $BaTiO_3$, $Ba_2LiTa_5O_{15}$ and $Ba_2LiNb_5O_{15}$, making the whole process more simple and the manufacturing cost more cheaper and preventing the formation of other compounds.

It is another object of the present invention to provide a dielectric ceramic material, which is based on the composite dielectric ceramic powders $(1-x)(BaTiO_3)-x(Ba_2LiTa_5O_{15})$ and $(1-x)(BaTiO_3)-x(Ba_2LiNb_5O_{15})$ that is respectively prepared by the initial oxide powders of $BaO$, $TiO_2$, $Li_2O$ and $Ta_2O_5$, or, $BaO$, $TiO_2$ $Li_2O$ and $Nb_2O_5$ subject to a respective predetermined percentage, wherein $BaTiO_3$ in $(1-x)(BaTiO_3)-x(Ba_2LiTa_5O_{15})$ has a mole percentage from 50% to 98% and $Ba_2LiTa_5O_{15}$ in $(1-x)(BaTiO_3)-x(Ba_2LiTa_5O_{15})$ has a mole percentage from 2% to 50%; $BaTiO_3$ in $(1-x)(BaTiO_3)-x(Ba_2LiNb_5O_{15})$ has a mole percentage from 60% to 95% and $Ba_2LiNb_5O_{15}$ in $(1-x)(BaTiO_3)-x(Ba_2LiTa_5O_{15})$ has a mole percentage from 5% to 40%.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Referring to FIGS. 1-5, a tablet-shaped capacitor preparation flow chart, an alternate form of the tablet-shaped capacitor preparation flow chart, a multilayer ceramic capacitor (MLCC) preparation flow chart and an alternate form of the multilayer ceramic capacitor (MLCC) preparation flow chart in accordance with the present invention as illustrated. As illustrated, during the preparation of the composite dielectric ceramic material, $BaO$, $TiO_2$, $Li_2O$ and $Ta_2O_5$, or $BaO$, $TiO_2$, $Li_2O$ and $Nb_2O_5$ are well mixed to form an initial powder material, and then this initial powder material is used to prepare the composite dielectric ceramic material $(1-x)(BaTiO_3)-x(Ba_2LiTa_5O_{15})$ and $(1-x)(BaTiO_3)-x(Ba_2LiNb_5O_{15})$ subject to the formulas of Table 2 and Table 3, wherein Table 2 is the oxide ingredient recipe table for the preparation of 100 mole $(1-x)(BaTiO_3)-x(Ba_2LiTa_5O_{15})$; Table 3 is the oxide ingredient recipe table for the preparation of 100 mole $(1-x)(BaTiO_3)-x(Ba_2LiNb_5O_{15})$.

Referring to FIGS. 1 and 2 again, 20 g composite dielectric ceramic powder prepared subject to Table 2 and Table 3 is put in a cylindrical polyethylene bottle of diameter 50 mm and volume 200 ml, and then 200 g Zirconia balls of diameter 3 mm are put in the cylindrical polyethylene bottle for use as grinding elements, and then ethanol is added to the cylindrical polyethylene bottle for use as a mixed solvent, and then the cylindrical polyethylene is rotated at 360 rpm for 6 hours to well mix the dielectric ceramic powder. The well mixed dielectric ceramic power is then dried at 80° C. Thereafter, prepare a ceramic embryogenic tablet by: adding 5 wt % polyvinyl alcohol (PVA) aqueous binder (water solution prepared by 15 wt % PVA and 85 wt % pure water) to the prepared dielectric ceramic powder and then well mixing the applied materials to enhance powder formability, and then using a 80 mesh stainless steel screen prepared subject to the specifications of American Society for Testing and Materials (ASTM) to screen the powder material, and then taking 0.4 g of the screened powder to cast a round embryogenic tablet of diameter 10 mm using a uniaxial molding method, and then heating the round embryogenic tablet under the atmosphere environment at 550° C. for 4 hours (at the heating rate of 5° C./min) to burn out polyvinyl alcohol (PVA) aqueous binder, and then sintering the round embryogenic tablet under a reducing atmosphere composed of 98% $N_2$-2% $H_2$ and 35° C. saturated water vapor at 1100° C.~1400° C. (at the heating rate of 5° C./min) for 2 hours, and then applying an reoxidation heat treatment to the sintered ceramic body under 60 ppm-150 ppm or atmospheric environment at 900° C.~1050° C. (at the heating rate of 5° C./min), and then using a screen-printing technique to print Ag, Cu or Ni on the sintered ceramic body so as to form an electrode on each of two opposite parallel sides of the sintered ceramic body. Thus, tablet-shaped capacitor examples according to Table 2 and Table 3 can then be prepared.

TABLE 2

$(1 - x)(BaTiO_3)$—$x(Ba_2LiTa_5O_{15})$ Formula Table
$(1 - x)(BaTiO_3)$—$x(Ba_2LiTa_5O_{15})$

| Examples | X value | BaO | TiO$_2$ | Li$_2$O | Unit: mole Ta$_2$O$_5$ |
|---|---|---|---|---|---|
| Example 1 | x = 0.030 | 97.00 | 97.00 | 1.50 | 7.50 |
| Example 2 | x = 0.050 | 95.00 | 95.00 | 2.50 | 12.50 |
| Example 3 | x = 0.100 | 90.00 | 90.00 | 5.00 | 25.00 |
| Example 4 | x = 0.125 | 87.50 | 87.50 | 0.625 | 31.25 |
| Example 5 | x = 0.150 | 85.00 | 85.00 | 7.50 | 37.50 |
| Example 6 | x = 0.200 | 80.00 | 80.00 | 10.00 | 50.00 |
| Example 7 | x = 0.260 | 74.00 | 74.00 | 13.00 | 65.00 |
| Example 8 | x = 0.300 | 70.00 | 70.00 | 15.00 | 75.00 |
| Example 9 | x = 0.400 | 60.00 | 60.00 | 20.00 | 100.00 |
| Example 10 | x = 0.500 | 50.00 | 50.00 | 25.00 | 125.00 |

TABLE 3

$(1 - x)(BaTiO_3)$—$x(Ba_2LiNb_5O_{15})$ Formula Table
$(1 - x)(BaTiO_3)$—$x(Ba_2LiNb_5O_{15})$

| Examples | X value | BaO | TiO$_2$ | Li$_2$O | Unit: mole Nb$_2$O$_5$ |
|---|---|---|---|---|---|
| Example 11 | x = 0.010 | 99.00 | 99.00 | 0.50 | 2.50 |
| Example 12 | x = 0.100 | 90.00 | 90.00 | 5.00 | 25.00 |
| Example 13 | x = 0.200 | 80.00 | 80.00 | 10.00 | 50.00 |
| Example 14 | x = 0.250 | 75.00 | 75.00 | 12.50 | 67.50 |

Figure 1:
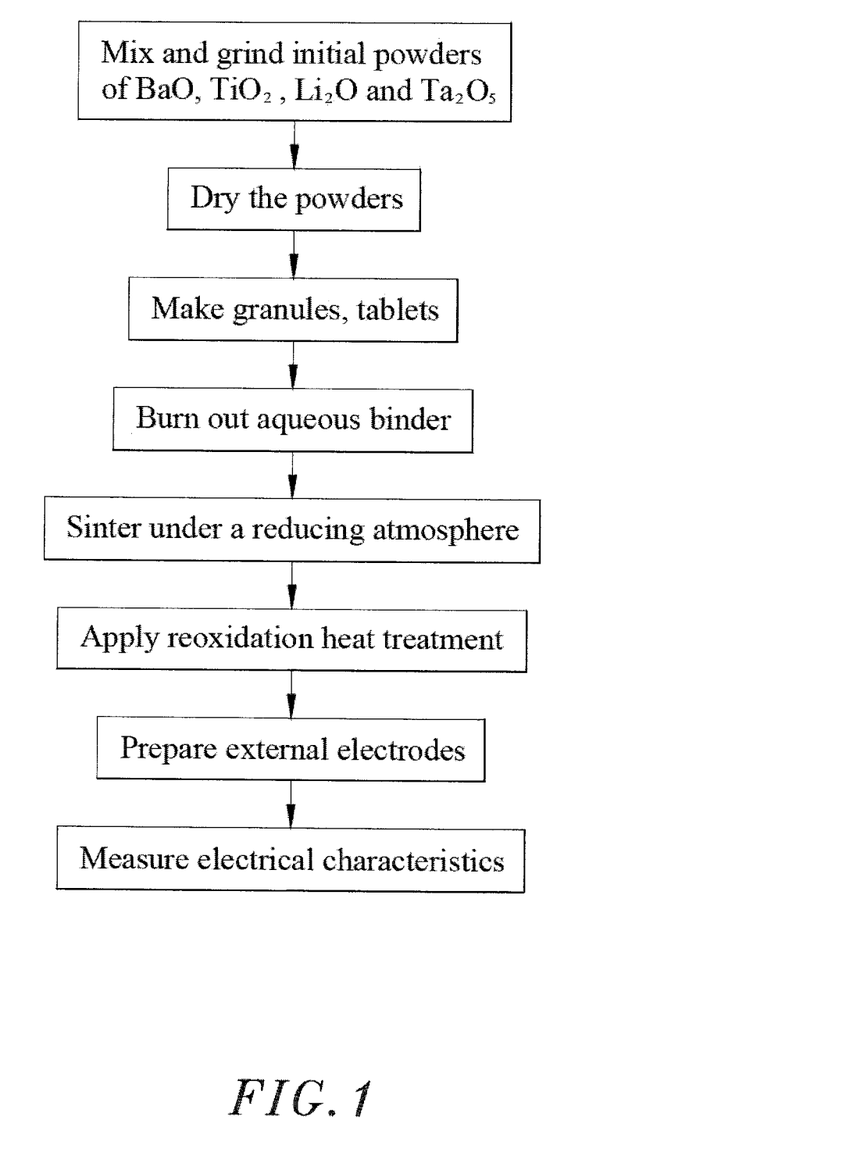
FIG. 1 is a tablet-shaped capacitor preparation flow chart in accordance with the present invention.
Figure 2:
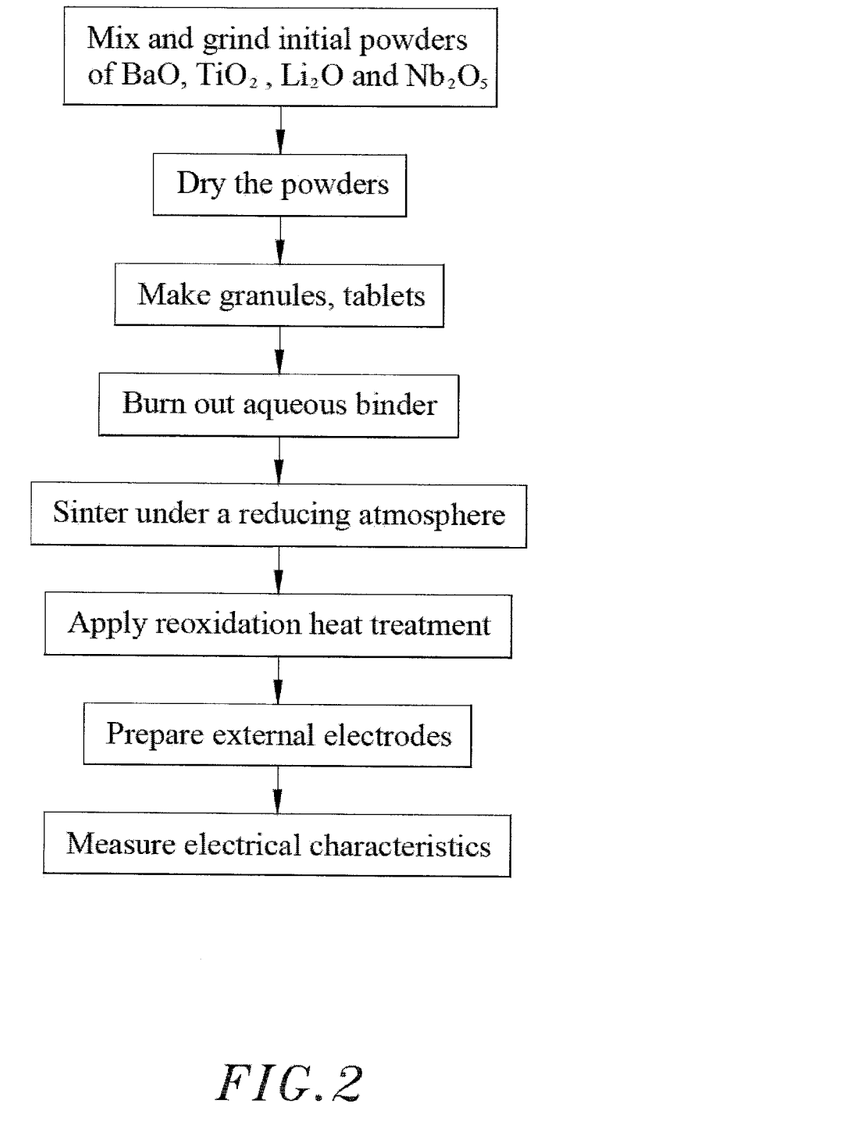
FIG. 2 illustrates an alternate form of the tablet-shaped capacitor preparation flow chart in accordance with the present invention.
Figure 3:
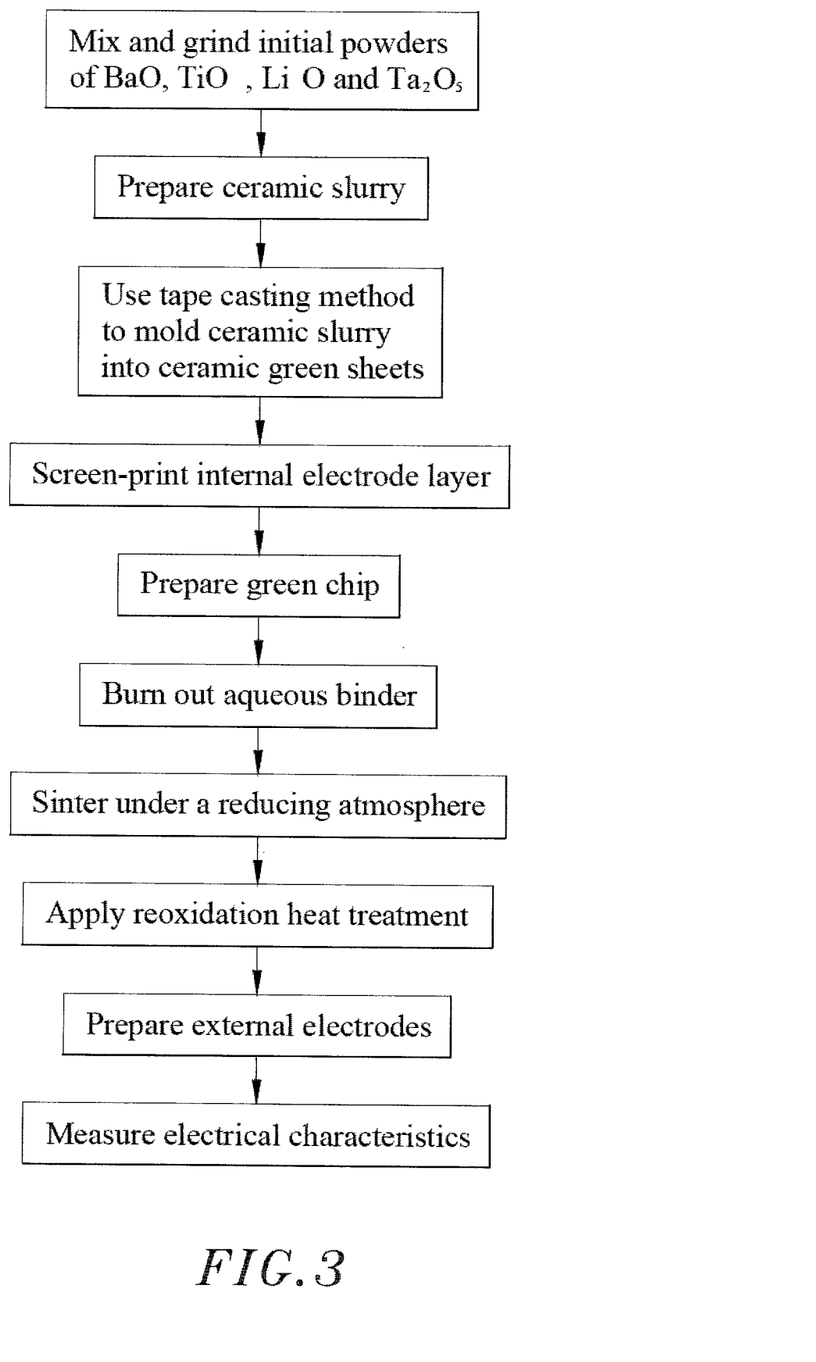
FIG. 3 is a multilayer ceramic capacitor (MLCC) preparation flow chart in accordance with the present invention.
Figure 4:
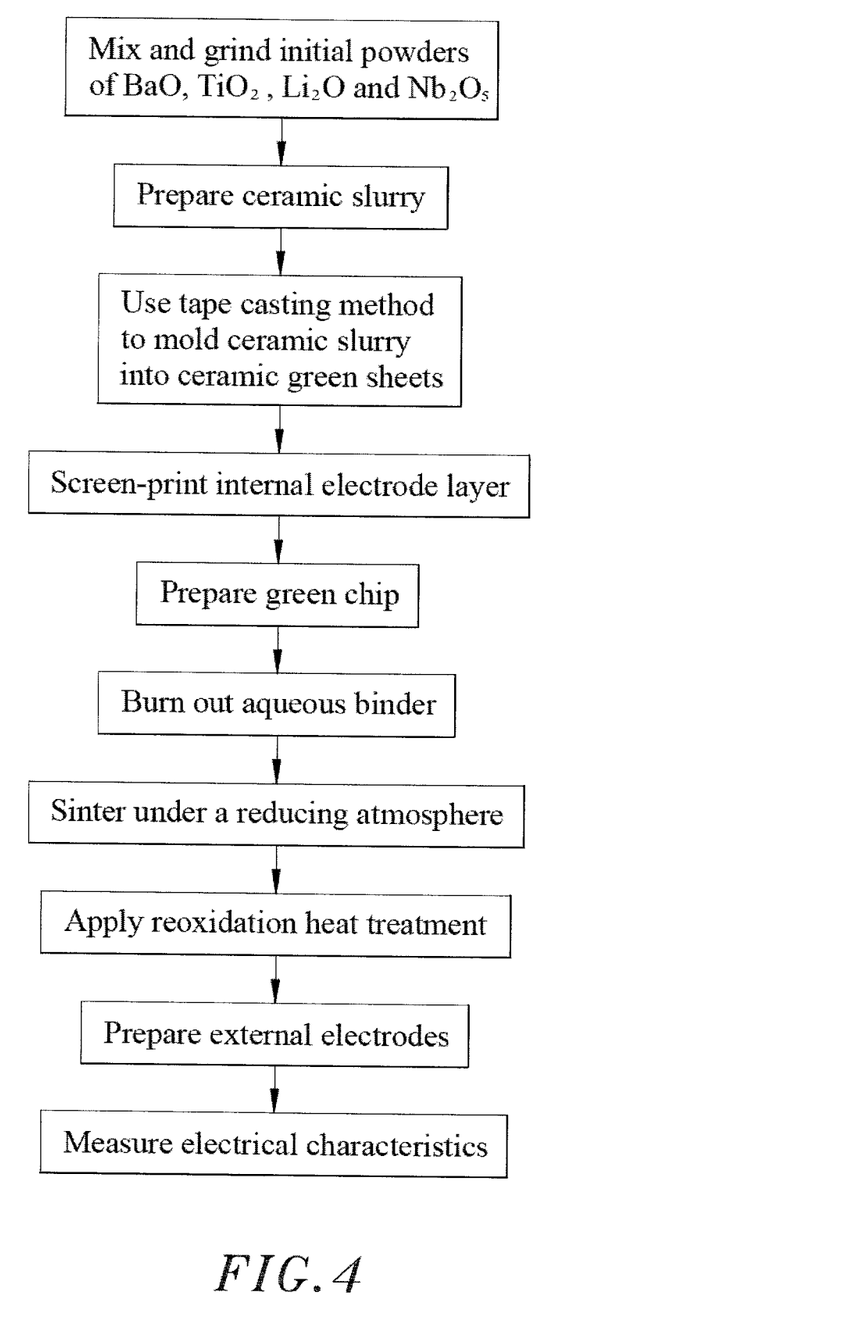
FIG. 4 illustrates an alternate form of the multilayer ceramic capacitor (MLCC) preparation flow chart in accordance with the present invention.
Figure 5:
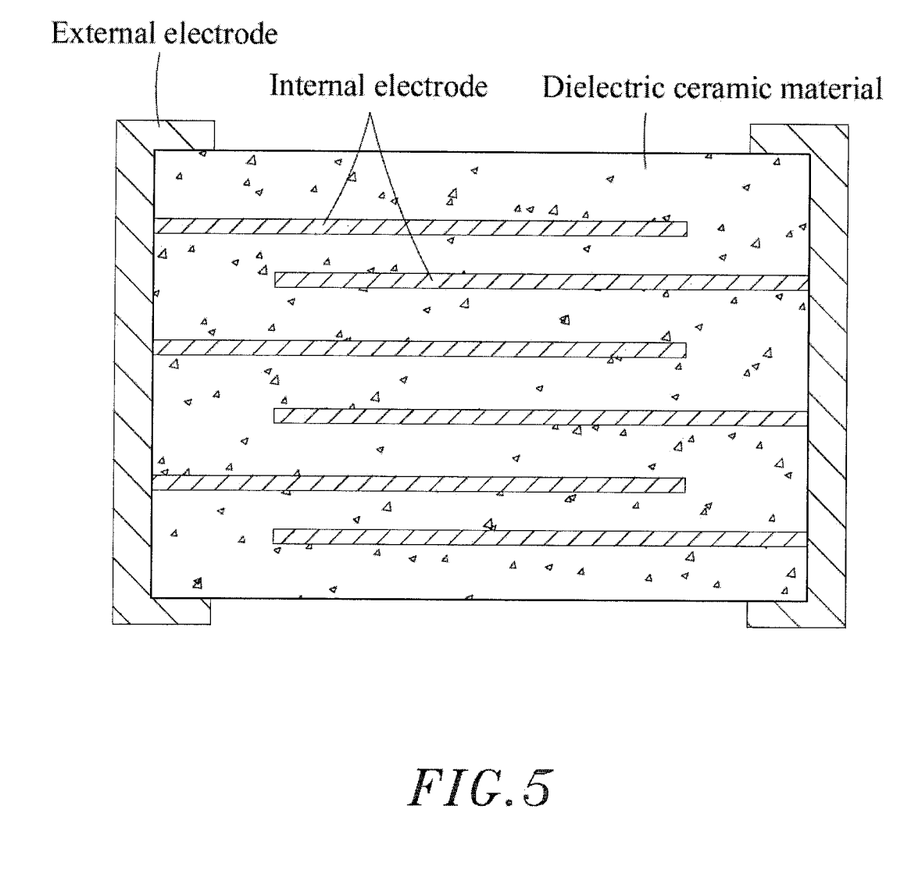
FIG. 5 is a schematic sectional view of a multilayer ceramic capacitor (MLCC) in accordance with the present invention.

Further, when using the composite dielectric ceramic material to make multilayer ceramic capacitor (MLCC) examples, use initial powder materials of at least two group materials including BaO, TiO$_2$, Li$_2$O and Ta$_2$O$_5$, or, BaO, TiO$_2$, Li$_2$O and Nb$_2$O$_5$ to prepare composite dielectric ceramic powders $(1-x)(BaTiO_3)-x(Ba_2LiTa_5O_{15})$ and $(1-x)(BaTiO_3)-x(Ba_2LiNb_5O_{15})$ according to the formula tables of Table 2 and Table 3 and the preparation flow charts of FIG. 3 and FIG. 4. Thereafter, add ethanol, plasticizing agents, bonding agents and dispersing agents to each prepared composite dielectric ceramic powder to obtain a respective ceramic slurry, and then use a tap casting method to mold each ceramic slurry into thin ceramic green sheets of thickness 30 μm, and then use a screen-printing technique to print commercial Ag, Pd or Ni metal paste on the thin ceramic green sheets embryonic strips subject to a predetermined internal electrode pattern.

Thereafter, stack up printed thin ceramic green sheets, and then use hydrostatic pressure to compress the stacked, printed thin ceramic green sheets, and then cut the stacked, printed thin ceramic green sheets into designed multilayer ceramic green chip, and then heat the multilayer ceramic green chip under the pure N$_2$ atmosphere at 330° C. (at the heating rate of 2° C./min) for 12 hours to burn out organic matters, and then sinter the multilayer ceramic green chip under a reducing atmosphere composed of 98% N$_2$-2% H$_2$ and 35° C. saturated water vapor at 1100° C.~1400° C. (at the heating rate of 3° C./min) for 2 hours and then reduce the heating the temperature to 900° C.~1050° C. (at the cooling rate of 4° C./min), and then apply an reoxidation heat treatment to the sintered bulk under 60 ppm~150 ppm or air atmosphere environment, and then reduce the temperature to room temperature to obtain multilayer ceramic sintered bulk. Thereafter, dip Ag or Cu external electrode paste on exposed ends of the internal electrodes, and then raise the temperature to 800° C.~900° C. (at the heating rate of 15° C./min) under the pure N$_2$ atmosphere, and then cool down the stove to room temperature, and the desired multilayer ceramic capacitor (MLCC) examples are prepared.

Figure 6:
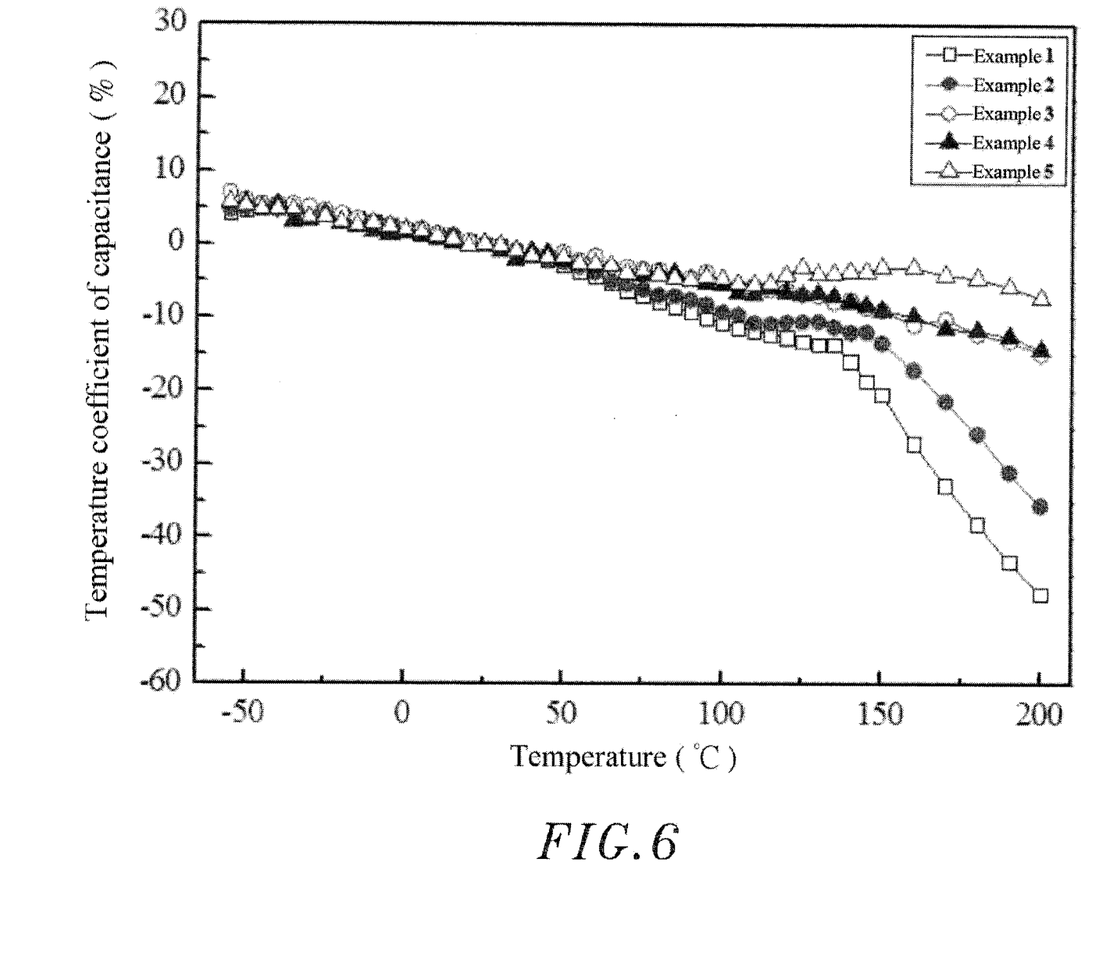
FIG. 6 is a dielectric characteristic measurement diagram of the dielectric ceramic material of $(1-x)(BaTiO_3)-x(Ba_2LiTa_5O_{15})$ ($x=0.03\sim0.15$) in accordance with the present invention.
Figure 7:
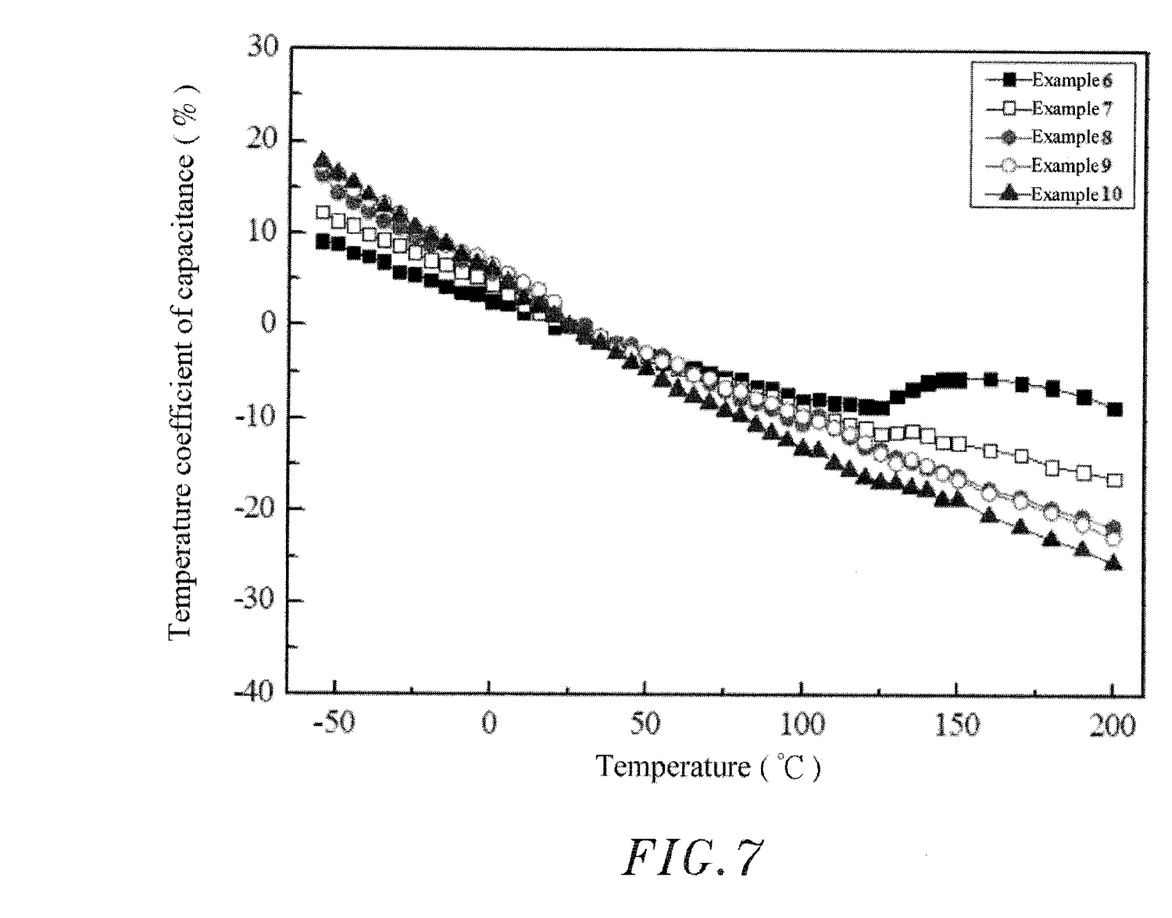
FIG. 7 is a dielectric characteristic measurement diagram of the dielectric ceramic material of $(1-x)(BaTiO_3)-x(Ba_2LiTa_5O_{15})$ ($x=0.20\sim0.50$) in accordance with the present invention.
Figure 8:
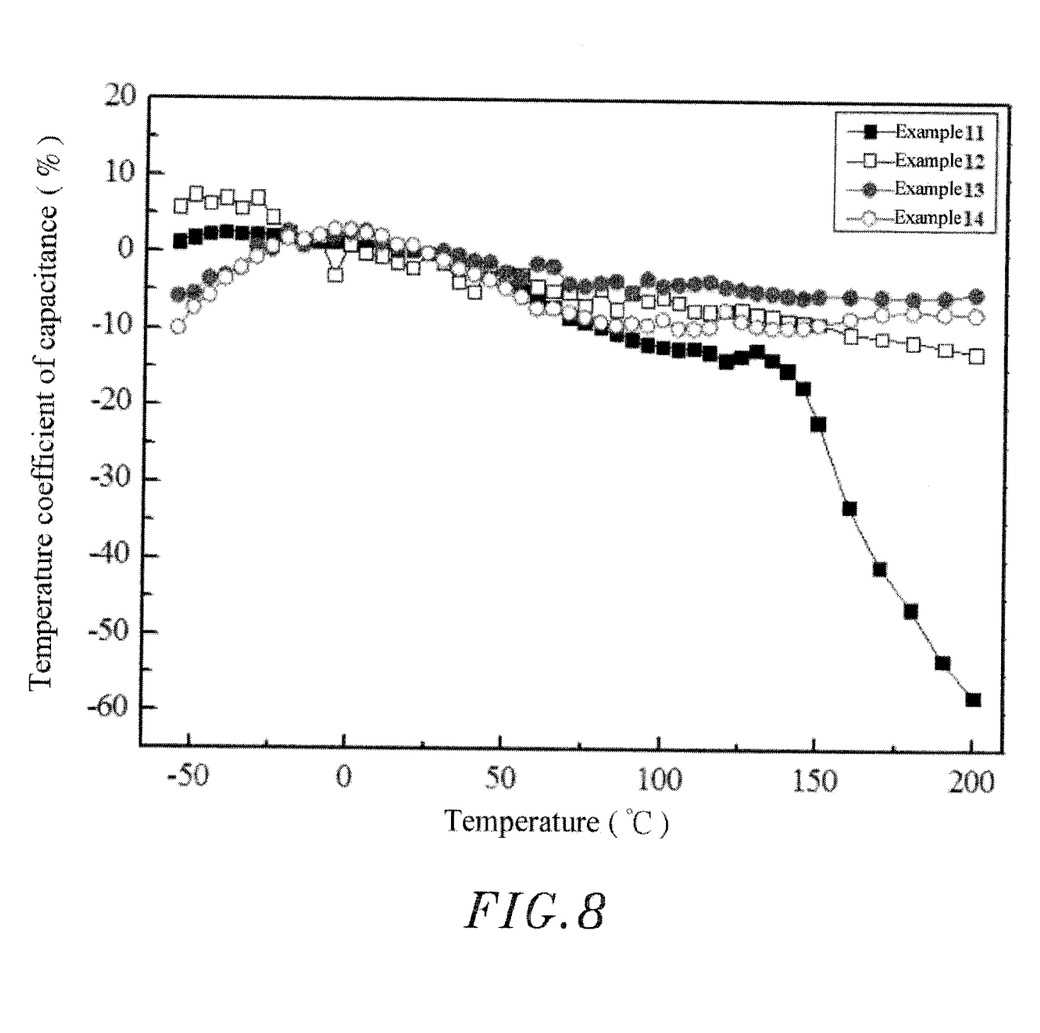
FIG. 8 is a dielectric characteristic measurement diagram of the dielectric ceramic material of $(1-x)(BaTiO_3)-x(Ba_2LiNb_5O_{15})$ ($x=0.01\sim0.25$) in accordance with the present invention.

Referring to FIGS. 6-8, a dielectric characteristic measurement diagram of the dielectric ceramic material of $(1-x)(BaTiO_3)-x(Ba_2LiTa_5O_{15})$ (x=0.03~0.15), a dielectric characteristic measurement diagram of the dielectric ceramic material of $(1-x)(BaTiO_3)-x(Ba_2LiTa_5O_{15})$ (x=0.20~0.50) and a dielectric characteristic measurement diagram of the dielectric ceramic material of $(1-x)(BaTiO_3)-x(Ba_2LiNb_5O_{15})$ (x=0.01~0.25) in accordance with the present invention are illustrated. As illustrated, when measuring the prepared composite dielectric ceramic capacitors of $(1-x)(BaTiO_3)-x(Ba_2LiTa_5O_{15})$ and $(1-x)(BaTiO_3)-x(Ba_2LiNb_5O_{15})$, use a LCR meter to measure temperature coefficient of capacitance (TCC) of every composite dielectric ceramic capacitor example, and then apply 1V at 1 kHz to measure the variation of capacitance value relative to temperature at −55° C.~200° C. and the dielectric-loss factor (DF) at room temperature.

Referring to the following Table 4 and FIGS. 6 and 7, measurement results of $(1-x)(BaTiO_3)-x(Ba_2LiTa_5O_{15})$ examples 1~10 are illustrated. From these measurement results, it is apparent that when x=0.03~0.05, the prepared dielectric ceramic capacitors have optimal dielectric characteristic stability and can satisfy EIA X8S specifications. It is apparent that increasing the proportion of Ba$_2$LiTa$_5$O$_{15}$ can get composite dielectric ceramic capacitors that have better temperature stability; when increasing x value from 0.03 to 0.05 (examples 1~2), the characteristics of the prepared capacitors are changed from satisfying X8S specifications to X8R specifications; when increasing the proportion of Ba$_2$LiTa$_5$O$_{15}$ to x=0.10~0.20 (examples 3~6), it can get capacitors that satisfy EIA X9R specifications; when x=0.26~0.50 (examples 7~10), the Temperature Coefficient of Capacitance (TCC) at −55° C.~25° C. TCC is gradually shifted toward the positive value, or toward the negative value when at 55° C.~200° C., enabling the characteristics of the prepared capacitors to be changed from satisfying X9R specifications to X9S and X9T specifications. From these results, we can know that a composite dielectric ceramic capacitor based on the dielectric ceramic material of $(1-x)(BaTiO_3)-x(Ba_2LiTa_5O_{15})$ according to the present invention has excellent dielectric characteristic stability with dielectric-loss factor (DF) within 1.5% when x value=0.03~0.50 (examples 1~10), it can effectively stabilize the dielectric characteristics; when x value is increased from 0.10 to 0.20, the most optimal dielectric characteristic stability can be obtained to satisfy EIA X9R specifications.

TABLE 4

Dielectric characteristics of (1 − x)(BaTiO₃)—x(Ba₂LiTa₅O₁₅)

| Example | BaTiO₃ | Ba₂LiTa₅O₁₅ | EIA Spec | K | 25° C. DF | −55° C. TCC | 125° C. TCC | 150° C. TCC | 200° C. TCC |
|---|---|---|---|---|---|---|---|---|---|
| 1 | 0.97 | 0.03 | X8S | 1076 | 0.49% | 4.2% | −13.2% | −20.3% | −47.5% |
| 2 | 0.95 | 0.05 | X8R | 571 | 0.37% | 4.6% | −10.6% | −13.5% | −35.5% |
| 3 | 0.90 | 0.10 | X9R | 150 | 0.18% | 7.1% | −6.8% | −8.9% | −14.9% |
| 4 | 0.875 | 0.125 | X9R | 116 | 0.74% | 5.4% | −6.9% | −9.0% | −14.4% |
| 5 | 0.85 | 0.15 | X9R | 312 | 0.48% | 5.8% | −3.1% | −3.1% | −7.3% |
| 6 | 0.80 | 0.20 | X9R | 252 | 0.28% | 9.2% | −8.6% | −5.6% | −8.6% |
| 7 | 0.74 | 0.26 | X9S | 206 | 0.16% | 12.3% | −11.5% | −12.5% | −16.3% |
| 8 | 0.70 | 0.30 | X9T | 192 | 0.13% | 16.3% | −13.3% | −16.1% | −21.6% |
| 9 | 0.60 | 0.40 | X9T | 219 | 0.56% | 17.4% | −13.6% | −16.5% | −21.9% |
| 10 | 0.50 | 0.50 | X9T | 212 | 1.02% | 17.7% | −16.7% | −18.6% | −25.5% |

Referring to the following Table 5 with reference to FIG. 8, from the measurement results made on examples 11~14 (1−x)(BaTiO₃)−x(Ba₂LiNb₅O₁₅), it can be known that increasing the percentage of Ba₂LiNb₅O₁₅ can get a capacitor with ultra stable dielectric characteristics. When x=0.01, the prepared dielectric ceramic capacitor has optimal dielectric characteristic stability and can satisfy EIA X8S specifications. It is apparent that increasing the proportion of Ba₂LiNb₅O₁₅ to over 0.10 can get a capacitor of significantly stable dielectric characteristic curve that satisfies EIA X9R specifications. From this result we can know that a composite dielectric ceramic capacitor based on the dielectric ceramic material of (1−x)(BaTiO₃)−x(Ba₂LiNb₅O₁₅) according to the present invention has excellent dielectric characteristic stability with dielectric-loss factor (DF) within 1.5%; when x value=0.01, it can effectively stabilize the dielectric characteristics; when x value is above 0.10, the most optimal dielectric characteristic stability can be obtained to satisfy EIA X9R specifications.

TABLE 5

Dielectric characteristics of (1 − x)(BaTiO₃)—x(Ba₂LiNb₅O₁₅)

| Example | BaTiO₃ | Ba₂LiNb₅O₁₅ | EIA Spec | K | 25° C. DF | −55° C. TCC | 125° C. TCC | 150° C. TCC | 200° C. TCC |
|---|---|---|---|---|---|---|---|---|---|
| 11 | 0.99 | 0.01 | X8S | 1383 | 0.50% | 1.3% | −13.4% | −21.9% | −57.8% |
| 12 | 0.90 | 0.10 | X9R | 148 | 0.24% | 5.9% | −7.2% | −9.0% | −12.8% |
| 13 | 0.80 | 0.20 | X9R | 222 | 0.27% | −5.8% | −4.6% | −5.4% | −5.0% |
| 14 | 0.75 | 0.25 | X9R | 489 | 1.30% | −10.0% | −8.7% | −9.1% | −7.7% |

The above-described (1−x)(BaTiO₃)−x(Ba2LiTa₅O₁₅) and (1−x)(BaTiO₃)−x(Ba₂LiNb₅O₁₅) capacitors and their initial oxide powder materials are not intended for use to limit the scope and spirit of the present invention. The most optimal form of the present invention is to use initial powder materials of at least two group materials including BaO, TiO₂, Li₂O and Ta₂O₅, or, BaO, TiO₂, Li₂O and Nb₂O₅ to prepare composite dielectric ceramic powders (1−x)(BaTiO₃)−x(Ba₂LiTa₅O₁₅) and (1−x)(BaTiO₃)−x(Ba₂LiNb₅O₁₅).

In accordance with the popular ceramic material common sense can infer that sintering BaO, TiO₂, Li₂O, Ta₂O₅ and Nb₂O₅ can produce various compounds, such as the oxides of BaTiO₃, BaTa₂O₆, BaNb₂O₆, Ba(Ti₀.₅Nb₀.₅)O₃, Li₂TiO₃, Li₄TiO₄, LiTaO₃ and LiNbO₃. These oxides can be used as initial powder materials for making (1−x)(BaTiO₃)−x(Ba₂LiTa₅O₁₅) and (1−x)(BaTiO₃)−x(Ba₂LiNb₅O₁₅) capacitors subject to a predetermined percentage. In actual application, carbonates of BaCO₃, BaCl₂, Li₂CO₃ and LiOH, chlorides and hydroxides can be converted into oxides under a high temperature. Therefore, these oxides can be prepared in accordance with the corresponding proportion of the respective metal element as initial powder materials for the (1−x)(BaTiO₃)−x(Ba₂LiTa₅O₁₅) and (1−x)(BaTiO3)−x(Ba₂LiNB₅O₁₅) capacitors Therefore, the invention provides dielectric ceramic materials of (1−x)(BaTiO₃)−x(Ba₂LiTa₅O₁₅) and (1−x)(BaTiO₃)−x (Ba₂LiTa₅O₁₅) that comprise BaO, TiO₂, Li₂O and Ta₂O₅, or Bao, TiO₂, Li₂O and Nb₂O₅ as the initial oxide powders, and is prepared in accordance with the corresponding proportion of the respective metal element. These dielectric ceramic materials simply use simple binary oxides as initial powder materials that are easy to obtain and inexpensive, and that eliminate the complicated manufacturing process of using other oxides of BaTiO₃ and LiTaO₃ or BaTiO₃, Li₂CO₃ and Ta₂O₅ as the initial powder materials to synthesize BaTiO₃, Ba₂LiTa5O₁₅ and Ba₂LiNb₅O₁₅, making the whole process more simple and the manufacturing cost more cheaper and preventing the formation of other compounds (Such as Li₃TaO₄). These dielectric ceramic materials are very practical for industrial application and have great commercial value, making the products more competitive.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A dielectric ceramic material, comprising BaTiO₃ and Ba₂LiTa₅O₁₅, wherein the mole percentage matches a composition formula of (1−x)(BaTiO₃)−x(Ba₂LiTa₅O₁₅), x is 0.03~0.05.

2. The dielectric ceramic material as claimed in claim 1, wherein said BaTiO₃ and said Ba₂LiTa₅O₁₅ are respectively prepared by the initial oxide powders of BaO, $TiO_2$, $Li_2O$ and $Ta_2O_5$ at a respective predetermined percentage.

3. A dielectric ceramic material, comprising $BaTiO_3$ and $Ba_2LiTa_5O_{15}$, wherein the mole percentage matches a composition formula of $(1-x)(BaTiO_3)-x(Ba_2LiTa_5O_{15})$, x is 0.10~0.20.

4. The dielectric ceramic material as claimed in claim 3, wherein said $BaTiO_3$ and said $Ba_2LiTa_5O_{15}$ are respectively prepared by the initial oxide powders of BaO, $TiO_2$, $Li_2O$ and $Ta_2O_5$ at a respective predetermined percentage.

5. A dielectric ceramic material, comprising $BaTiO_3$ and $Ba_2LiTa_5O_{15}$, wherein the mole percentage matches a composition formula of $(1-x)(BaTiO_3)-x(Ba_2LiTa_5O_{15})$, x is 0.26~0.50.

6. The dielectric ceramic material as claimed in claim 5, wherein said $BaTiO_3$ and said $Ba_2LiTa_5O_{15}$ are respectively prepared by the initial oxide powders of BaO, $TiO_2$, $Li_2O$ and $Ta_2O_5$ at a respective predetermined percentage.

* * * * *